US012673701B2

(12) United States Patent
Poulet et al.

(10) Patent No.: US 12,673,701 B2
(45) Date of Patent: Jul. 7, 2026

---

(54) DRIVE MODE SELECTION

(71) Applicant: Nissan North America, Inc., Franklin, TN (US)

(72) Inventors: Kevin Poulet, Mountain View, CA (US); Aude Laurent, Redwood City, CA (US); Najamuddin Mirza Baig, San Jose, CA (US)

(73) Assignee: Nissan North America, Inc., Franklin, TN (US)

( * ) Notice: Subject to any disclaimer, the term of this patent is extended or adjusted under 35 U.S.C. 154(b) by 319 days.

(21) Appl. No.: 17/007,591

(22) Filed: Aug. 31, 2020

(65) Prior Publication Data

US 2022/0063660 A1 Mar. 3, 2022

(51) Int. Cl.
| | |
|---|---|
| *B60W 60/00* | (2020.01) |
| *B60W 40/04* | (2006.01) |
| *B60W 50/08* | (2020.01) |
| *B60W 50/14* | (2020.01) |
| *G06V 20/58* | (2022.01) |
| *B60W 50/00* | (2006.01) |

(52) U.S. Cl.
CPC .......... *B60W 60/005* (2020.02); *B60W 40/04* (2013.01); *B60W 50/082* (2013.01); *B60W 50/14* (2013.01); *G06V 20/582* (2022.01); *G06V 20/584* (2022.01); *B60W 2050/0072* (2013.01); *B60W 2556/40* (2020.02); *B60W 2556/50* (2020.02)

(58) Field of Classification Search
CPC .. B60W 60/005; B60W 40/04; B60W 50/082; B60W 50/14; B60W 2050/0072; B60W 2556/40; B60W 2556/50; B60W 2556/60; G06V 20/582; G06V 20/584
See application file for complete search history.

(56) References Cited

U.S. PATENT DOCUMENTS

| | | | | |
|---|---|---|---|---|
| 2016/0311323 | A1* | 10/2016 | Lee .......................... | G06F 3/013 |
| 2017/0080948 | A1* | 3/2017 | Lubbers ................ | B60W 50/14 |
| 2018/0196442 | A1* | 7/2018 | Wang .................... | G05D 1/0274 |
| 2019/0152468 | A1* | 5/2019 | Hall ...................... | B60W 10/08 |
| 2019/0184981 | A1* | 6/2019 | Jung ..................... | B60W 30/06 |
| 2020/0117204 | A1* | 4/2020 | Lindemann ....... | B60W 60/0023 |
| 2020/0201344 | A1* | 6/2020 | Viswanathan ....... | G06V 20/584 |
| 2022/0073137 | A1* | 3/2022 | Min ...................... | B60W 50/08 |
| 2022/0126878 | A1* | 4/2022 | Moustafa .......... | B60W 60/0053 |
| 2022/0135039 | A1* | 5/2022 | Jardine ........... | B60W 30/18159 |
| | | | | 701/26 |

* cited by examiner

*Primary Examiner* — Ramya P Burgess
*Assistant Examiner* — Chanmin Park
(74) *Attorney, Agent, or Firm* — Young Basile Hanlon & MacFarlane, P.C.

(57) ABSTRACT

Navigating a vehicle from an origin location to a destination location includes receiving, from a requester, the origin location and the destination location; determining a transition point between the origin location and the destination location that partitions a portion of a route between the origin location to the destination location into a first route segment and a second route segment; and providing the transition point, the first route segment, and the second route segment to the requester. The vehicle is to be driven according to a first drive mode in the first route segment that ends at the transition point and according to a second drive mode in the second route segment that starts at the transition point.

20 Claims, 7 Drawing Sheets

300

400

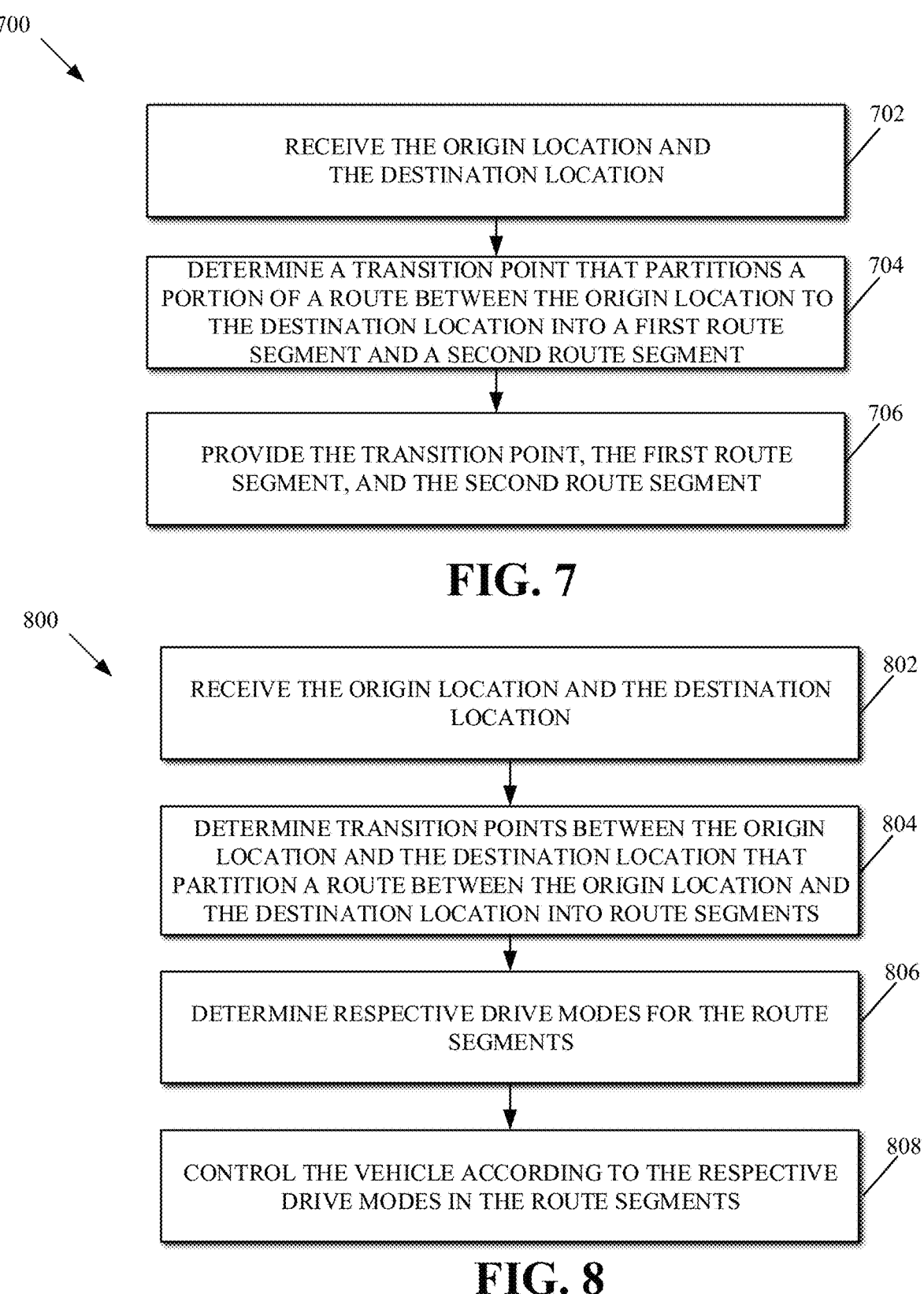

700

702
RECEIVE THE ORIGIN LOCATION AND
THE DESTINATION LOCATION

704
DETERMINE A TRANSITION POINT THAT PARTITIONS A
PORTION OF A ROUTE BETWEEN THE ORIGIN LOCATION TO
THE DESTINATION LOCATION INTO A FIRST ROUTE
SEGMENT AND A SECOND ROUTE SEGMENT

706
PROVIDE THE TRANSITION POINT, THE FIRST ROUTE
SEGMENT, AND THE SECOND ROUTE SEGMENT

802
RECEIVE THE ORIGIN LOCATION AND THE DESTINATION
LOCATION

804
DETERMINE TRANSITION POINTS BETWEEN THE ORIGIN
LOCATION AND THE DESTINATION LOCATION THAT
PARTITION A ROUTE BETWEEN THE ORIGIN LOCATION AND
THE DESTINATION LOCATION INTO ROUTE SEGMENTS

806
DETERMINE RESPECTIVE DRIVE MODES FOR THE ROUTE
SEGMENTS

808
CONTROL THE VEHICLE ACCORDING TO THE RESPECTIVE
DRIVE MODES IN THE ROUTE SEGMENTS

FIG. 8

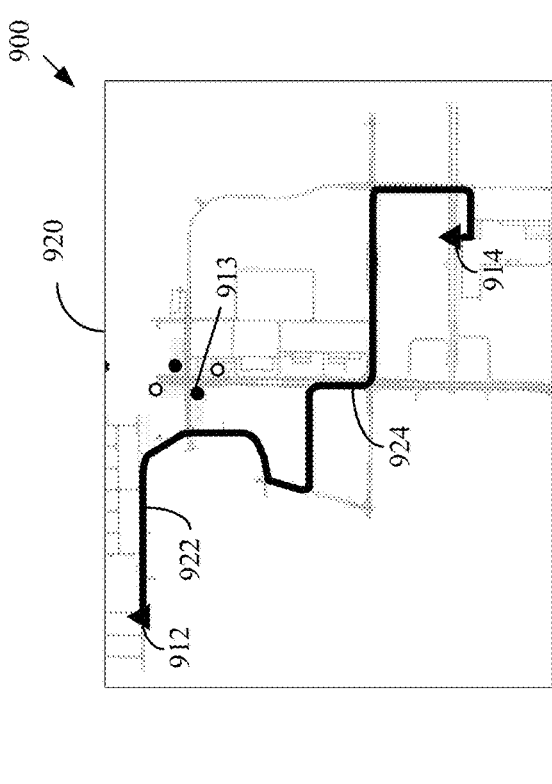
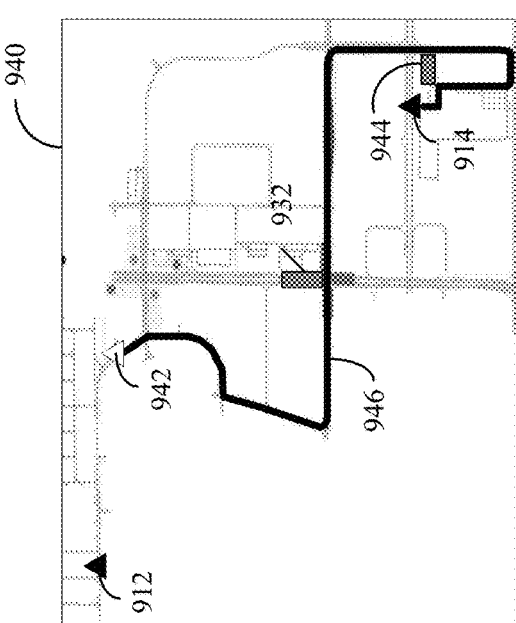
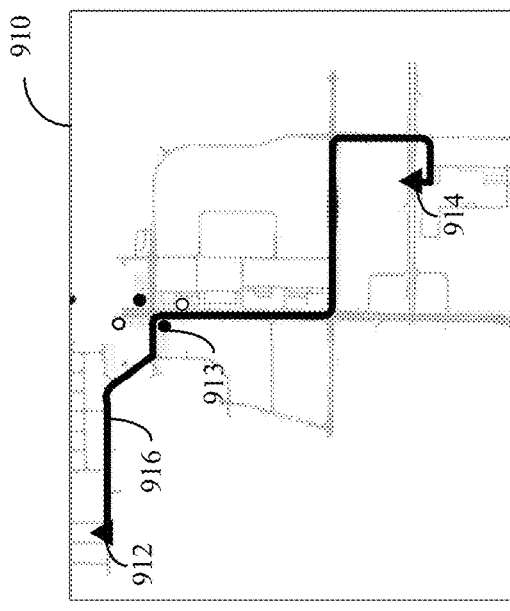
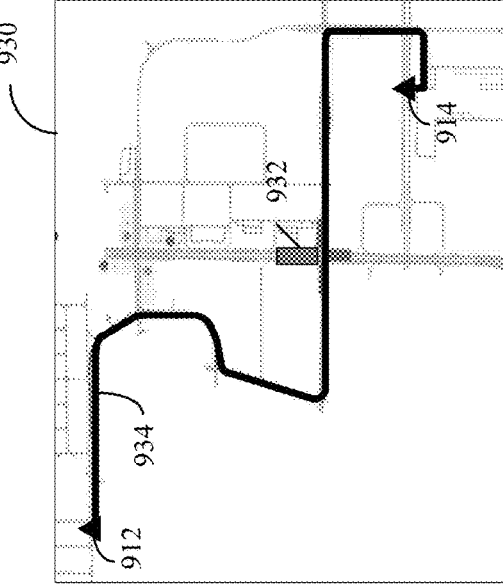
FIG. 9

DRIVE MODE SELECTION

TECHNICAL FIELD

This application generally relates to vehicle navigation and more particularly to tele-operation assistance in obstruction situations.

BACKGROUND

A vehicle may be equipped with navigation-generation capabilities (e.g., a navigation system). A driver may provide an origin location and a destination location and the navigation system can generate a route that the driver can follow. The route typically includes turn-by-turn instructions that can be followed in real time.

Generating the route typically relies on map data that include road information. However, map data may not be available for at least a portion of the route between the origin location and destination location. This, and other problems, can be overcome by implementations according to this disclosure.

SUMMARY

A first aspect is a method for navigating a vehicle from an origin location to a destination location. The method includes receiving, from a requester, the origin location and the destination location; determining a transition point between the origin location and the destination location that partitions a portion of a route between the origin location to the destination location into a first route segment and a second route segment; and providing the transition point, the first route segment, and the second route segment to the requester. The vehicle is to be driven according to a first drive mode in the first route segment that ends at the transition point and the vehicle is to be driven according to a second drive mode in the second route segment that starts at the transition point; the first drive mode is different from the second drive mode; and the first drive mode and the second drive mode are selected from available drive modes, each of the available drive modes indicating a respective way of operating the vehicle.

A second aspect is a system for routing a vehicle from an origin location to a destination location. The system includes a drive-mode selector and a vehicle-control module. The drive-mode selector is configured to receive the origin location and the destination location; determine transition points between the origin location and the destination location, such that the transition points partition a route between the origin location and the destination location into route segments; and determine respective drive modes for the route segments. The vehicle-control module is configured to control the vehicle according to the respective drive modes in the route segments.

A third aspect is an apparatus for routing a vehicle from an origin location to a destination location. The apparatus include a processor that is configured to receive, from the vehicle, a request to determine a route from the origin location to the destination location; determine the route from the origin location to the destination location by partitioning the route into route segments and assigning respective drive modes to the route segments, such that the route segments and the respective drive modes are selected based on availability of mapping data of the route segments; and provide, to the vehicle, the route segments and the respective drive modes.

These and other aspects of the present disclosure are disclosed in the following detailed description of the embodiments, the appended claims and the accompanying figures.

BRIEF DESCRIPTION OF THE DRAWINGS

The disclosed technology is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 7 is an example of a flowchart of a technique for drive mode selection according to an implementation of this disclosure.

FIG. 8 is an example of a flowchart of a technique for routing a vehicle from an origin location to a destination location according to an implementation of this disclosure.

FIG. 9 illustrates using traffic information to optimize a route according to implementations of this disclosure.

DETAILED DESCRIPTION

Figure 1:
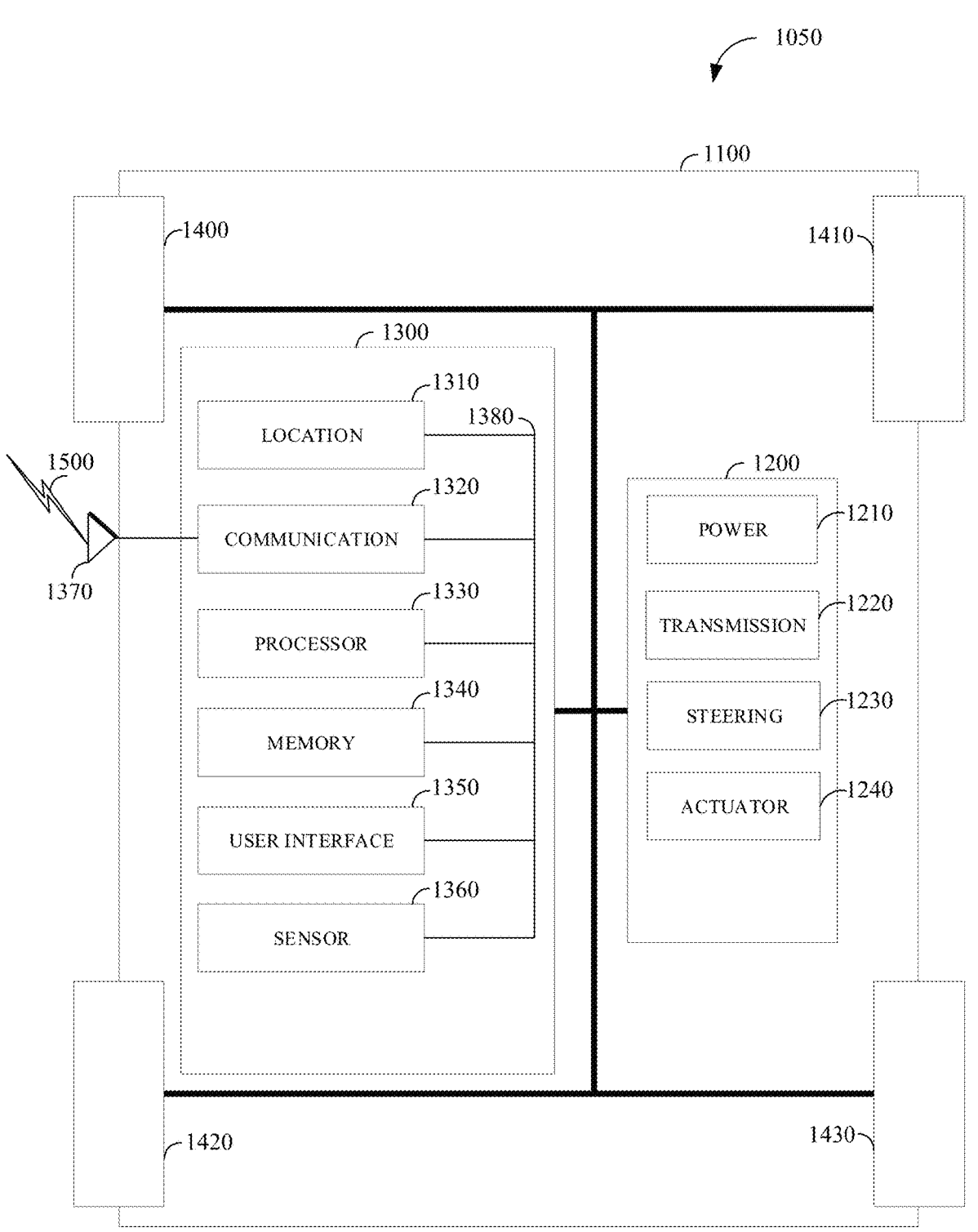
FIG. 1 is a diagram of an example of a portion of a vehicle in which the aspects, features, and elements disclosed herein may be implemented.

As mentioned, a navigation system can generate a route from an origin location to a destination location. An agent follows the turn-by-turn instructions of the route to navigate a vehicle from the origin location to the destination location. The agent can be a human driver of the vehicle. In the case of an autonomous vehicle (AV), the agent can also be a vehicle control module that autonomously navigates the vehicle.

In an example, the navigation system can obtain global positioning system (GPS) coordinates of the origin location to the destination location; obtain from map data lane information (e.g., road information, which can include lane identifiers); find the route based on, for example, shortest length or shortest duration or other optimization criteria; generate a list of lane identifiers for the route; and convert the lane identifiers to natural directions for the driver, which may include converting the lane identifiers to GPS coordinates. The route can be displayed on a display of the vehicle.

In the case of autonomous driving, for example, the map information may be obtained from a high-definition (HD) (e.g., high-precision) map data (e.g., map database), which can be used by an autonomous vehicle. The HD map data can include accurate information regarding a vehicle transportation network to within a few centimeters. For example, the HD map data can include details regarding road lanes, road dividers, traffic signals, traffic signs, speed limits, and the like.

Such a model has shortcomings. For example, in the case of an autonomous vehicle, HD map data may not be available for at least a portion of an optimal route between the origin location and the destination location. Thus, the navigation system may not obtain the optimal route; rather the navigation system may identify a route such that HD map data are available for the whole route. Thus, finding an optimal (or, at least, preferred) whole route from an origin location to a destination location may include identifying segments of the route that may require drive modes other than an autonomous drive mode.

A drive mode can be defined as a method of operating a vehicle. For example, an autonomous drive mode can be such that the autonomous driving module of the vehicle controls the operations (e.g., actuation, etc.) of the controls of an autonomous vehicle. For example, a manual drive mode can be such that the vehicle is operated by a human driver. For example, an advanced-driver-assistance-system (ADAS) drive mode (also referred to as driver-assistance drive mode) can be such that the vehicle safety is automated and enhanced by alerting the driver to potential problems and avoiding collisions. For example, a tele-operator assisted drive mode can be such that a remote operator can remotely operate the vehicle such as by identifying a path for the vehicle to follows. For example, the drive mode can be a stored (e.g., recorded, etc.) path drive mode such that a pre-recorded path can be used. Other drive modes are possible.

The disclosure herein describes routing systems and techniques (collectively, routing system) that can identify (e.g., determine, calculate, select, retrieve, or identify in any manner whatsoever) a path (i.e., a whole route) from an origin location to a destination location by partitioning the route into multiple route segments where each route segment has (e.g., is assigned, etc.) a corresponding drive mode.

In identifying the route of a vehicle from one point to another, the driver or an occupant of the vehicle can be notified (e.g., told, informed, etc.) of which drive mode is available for which segment of the route. To illustrate, and without loss of generality, the drive mode can be the autonomous mode from a point A (e.g., the origin location) to a point B (e.g., a first intermediate location); and assuming that the vehicle cannot be autonomously driven from point B to point C (e.g., a second intermediate location), the drive mode between point B and point C can be the manual drive mode (e.g., the driver is informed to manually control the vehicle from point B to point C); and then from point C to point D (e.g., the destination location), the drive mode can be the tele-operator mode (e.g., a remotely generated path is to be provided to the vehicle).

A critical limitation in navigation systems for autonomous vehicles is the reliance on the availability of HD map data. Implementations according to this disclosure can overcome this limitation by being able to navigate a vehicle (e.g., an autonomous vehicle or a connected vehicle) from an origin location to a destination location without having a dependency of on a HD map only and by using an autonomous and non-autonomous driving modes. Combinations of different technologies (i.e., driving modes) can be used to ensure that an end-to-end route (i.e., a whole route) can be identified even in the absence of HD map data.

Additionally, an end-to-end route can be selected so as to be optimized for certain provided constraints. For example, a user may wish that the generated whole route is to be optimized for time (e.g., minimal time) or some other optimization criteria. To illustrate, a fastest route may require the use of the manual driving mode than another route that may be optimized for maximum highway driving. For example, a user may wish that the generated route be optimized to maximize the amount of time spent using the autonomous driving mode.

To describe some implementations in greater detail, reference is made to the following figures.

FIG. 1 is a diagram of an example of a vehicle 1050 in which the aspects, features, and elements disclosed herein may be implemented. The vehicle 1050 includes a chassis 1100, a powertrain 1200, a controller 1300, wheels 1400/1410/1420/1430, or any other element or combination of elements of a vehicle. Although the vehicle 1050 is shown as including four wheels 1400/1410/1420/1430 for simplicity, any other propulsion device or devices, such as a propeller or tread, may be used. In FIG. 1, the lines interconnecting elements, such as the powertrain 1200, the controller 1300, and the wheels 1400/1410/1420/1430, indicate that information, such as data or control signals, power, such as electrical power or torque, or both information and power, may be communicated between the respective elements. For example, the controller 1300 may receive power from the powertrain 1200 and communicate with the powertrain 1200, the wheels 1400/1410/1420/1430, or both, to control the vehicle 1050, which can include accelerating, decelerating, steering, or otherwise controlling the vehicle 1050.

The powertrain 1200 includes a power source 1210, a transmission 1220, a steering unit 1230, a vehicle actuator 1240, or any other element or combination of elements of a powertrain, such as a suspension, a drive shaft, axles, or an exhaust system. Although shown separately, the wheels 1400/1410/1420/1430 may be included in the powertrain 1200.

The power source 1210 may be any device or combination of devices operative to provide energy, such as electrical energy, thermal energy, or kinetic energy. For example, the power source 1210 includes an engine, such as an internal combustion engine, an electric motor, or a combination of an internal combustion engine and an electric motor, and is operative to provide kinetic energy as a motive force to one or more of the wheels 1400/1410/1420/1430. In some embodiments, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy, such as kinetic energy, from the power source 1210, and transmits the energy to the wheels 1400/1410/1420/1430 to provide a motive force. The transmission 1220 may be controlled by the controller 1300, the vehicle actuator 1240 or both. The steering unit 1230 may be controlled by the controller 1300, the vehicle actuator 1240, or both and controls the wheels 1400/1410/1420/1430 to steer the vehicle. The vehicle actuator 1240 may receive signals from the controller 1300 and may actuate or control the power source 1210, the transmission 1220, the steering unit 1230, or any combination thereof to operate the vehicle 1050.

In some embodiments, the controller 1300 includes a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof can be integrated in one or more electronic units, circuits, or chips.

In some embodiments, the processor 1330 includes any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

In some embodiments, the processor 1330 may be configured to execute instructions including instructions for remote operation which may be used to operate the vehicle 1050 from a remote location including the operations center. The instructions for remote operation may be stored in the vehicle 1050 or received from an external source such as a traffic management center, or server computing devices, which may include cloud-based server computing devices. The processor 1330 may be configured to execute instructions for navigating a vehicle from an origin location to a destination location as described herein.

The memory 1340 may include any tangible non-transitory computer-usable or computer-readable medium, capable of, for example, containing, storing, communicating, or transporting machine readable instructions or any information associated therewith, for use by or in connection with the processor 1330. The memory 1340 is, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

The electronic communication interface 1370 may be a wireless antenna, as shown, a wired communication port, an optical communication port, or any other wired or wireless unit capable of interfacing with a wired or wireless electronic communication medium 1500.

The electronic communication unit 1320 may be configured to transmit or receive signals via the wired or wireless electronic communication medium 1500, such as via the electronic communication interface 1370. Although not explicitly shown in FIG. 1, the electronic communication unit 1320 is configured to transmit, receive, or both via any wired or wireless communication medium, such as radio frequency (RF), ultra violet (UV), visible light, fiber optic, wire line, or a combination thereof. Although FIG. 1 shows a single one of the electronic communication unit 1320 and a single one of the electronic communication interface 1370, any number of communication units and any number of communication interfaces may be used. In some embodiments, the electronic communication unit 1320 can include a dedicated short-range communications (DSRC) unit, a wireless safety unit (WSU), IEEE 802.11p (Wifi-P), or a combination thereof.

The location unit 1310 may determine geolocation information, including but not limited to longitude, latitude, elevation, direction of travel, or speed, of the vehicle 1050. For example, the location unit includes a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1050, a current position of the vehicle 1050 in two or three dimensions, a current angular orientation of the vehicle 1050, or a combination thereof.

The user interface 1350 may include any unit capable of being used as an interface by a person, including any of a virtual keypad, a physical keypad, a touchpad, a display, a touchscreen, a speaker, a microphone, a video camera, a sensor, and a printer. The user interface 1350 may be operatively coupled with the processor 1330, as shown, or with any other element of the controller 1300. Although shown as a single unit, the user interface 1350 can include one or more physical units. For example, the user interface 1350 includes an audio interface for performing audio communication with a person, and a touch display for performing visual and touch based communication with the person.

The sensor 1360 may include one or more sensors, such as an array of sensors, which may be operable to provide information that may be used to control the vehicle. The sensor 1360 can provide information regarding current operating characteristics of the vehicle or its surrounding. The sensors 1360 include, for example, a speed sensor, acceleration sensors, a steering angle sensor, traction-related sensors, braking-related sensors, or any sensor, or combination of sensors, that is operable to report information regarding some aspect of the current dynamic situation of the vehicle 1050.

In some embodiments, the sensor 1360 may include sensors that are operable to obtain information regarding the physical environment surrounding the vehicle 1050. For example, one or more sensors detect road geometry and obstacles, such as fixed obstacles, vehicles, cyclists, and pedestrians. In some embodiments, the sensor 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensor 1360 and the location unit 1310 are combined.

Although not shown separately, the vehicle 1050 may include a trajectory controller. For example, the controller 1300 may include a trajectory controller. The trajectory controller may be operable to obtain information describing a current state of the vehicle 1050 and a route planned for the vehicle 1050, and, based on this information, to determine and optimize a trajectory for the vehicle 1050. In some embodiments, the trajectory controller outputs signals operable to control the vehicle 1050 such that the vehicle 1050 follows the trajectory that is determined by the trajectory controller. For example, the output of the trajectory controller can be an optimized trajectory that may be supplied to the powertrain 1200, the wheels 1400/1410/1420/1430, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400/1410/1420/1430 may be a steered wheel, which is pivoted to a steering angle under control of the steering unit 1230, a propelled wheel, which is torqued to propel the vehicle 1050 under control of the transmission 1220, or a steered and propelled wheel that steers and propels the vehicle 1050.

A vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
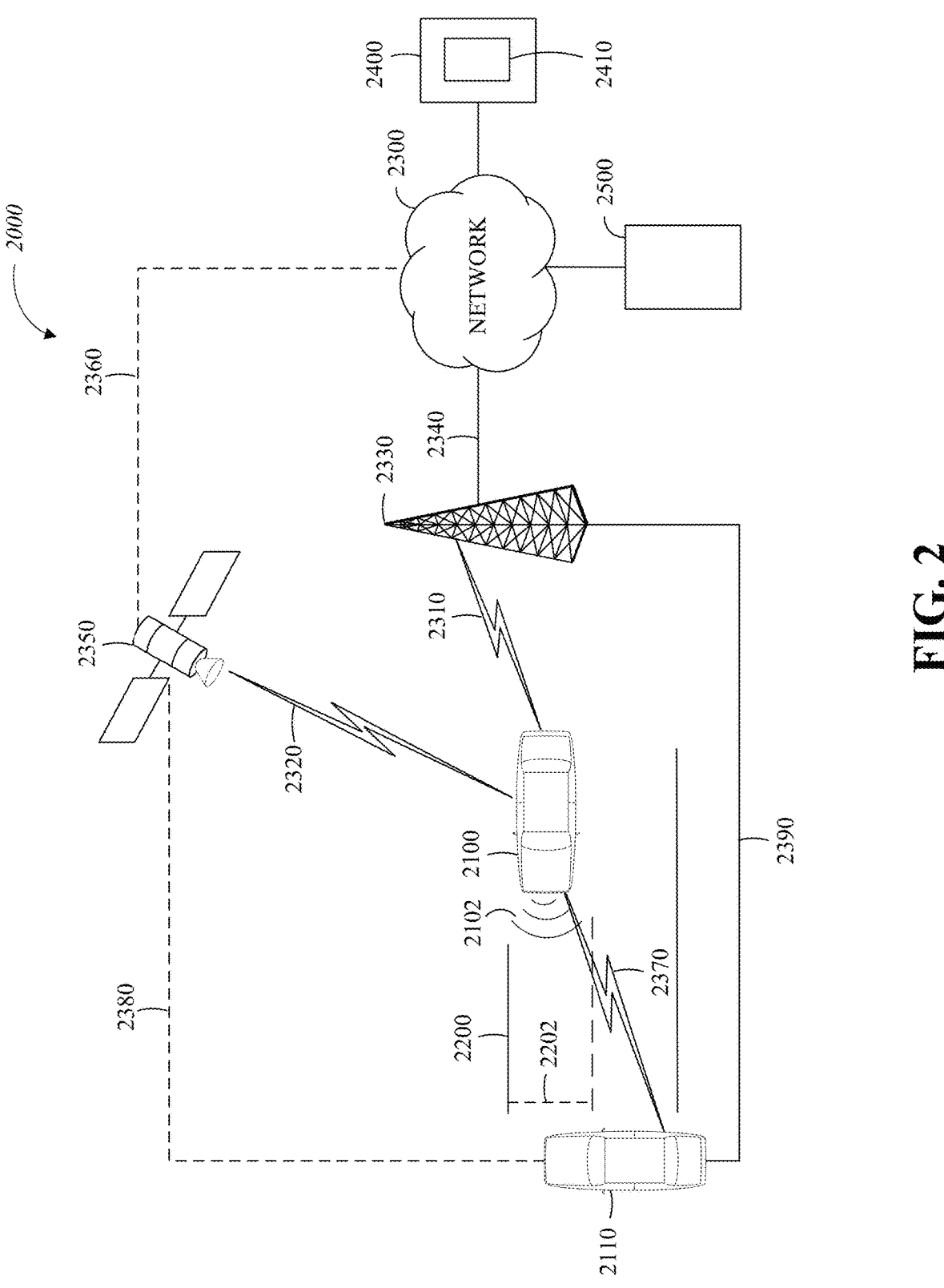
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 2000 in which the aspects, features, and elements disclosed herein may be implemented. The vehicle transportation and communication system 2000 includes a vehicle 2100, such as the vehicle 1050 shown in FIG. 1, and one or more external objects, such as an external object 2110, which can include any form of transportation, such as the vehicle 1050 shown in FIG. 1, a pedestrian, cyclist, as well as any form of a structure, such as a building. The vehicle 2100 may travel via one or more portions of a transportation network 2200, and may communicate with the external object 2110 via one or more of an electronic communication network 2300. Although not explicitly shown in FIG. 2, a vehicle may traverse an area that is not expressly or completely included in a transportation network, such as an off-road area. In some embodiments the transportation network 2200 may include one or more of a vehicle detection sensor 2202, such as an inductive loop sensor, which may be used to detect the movement of vehicles on the transportation network 2200.

The electronic communication network 2300 may be a multiple access system that provides for communication, such as voice communication, data communication, video communication, messaging communication, or a combination thereof, between the vehicle 2100, the external object 2110, and an operations center 2400. For example, the vehicle 2100 or the external object 2110 may receive information, such as information representing the transportation network 2200, from the operations center 2400 via the electronic communication network 2300.

The operations center 2400 includes a controller apparatus 2410 which includes some or all of the features of the controller 1300 shown in FIG. 1. The controller apparatus 2410 can monitor and coordinate the movement of vehicles, including autonomous vehicles. The controller apparatus 2410 may monitor the state or condition of vehicles, such as the vehicle 2100, and external objects, such as the external object 2110. The controller apparatus 2410 can receive vehicle data and infrastructure data including any of: vehicle velocity; vehicle location; vehicle operational state; vehicle destination; vehicle route; vehicle sensor data; external object velocity; external object location; external object operational state; external object destination; external object route; and external object sensor data.

Further, the controller apparatus 2410 can establish remote control over one or more vehicles, such as the vehicle 2100, or external objects, such as the external object 2110. In this way, the controller apparatus 2410 may teleoperate the vehicles or external objects from a remote location. The controller apparatus 2410 may exchange (send or receive) state data with vehicles, external objects, or computing devices such as the vehicle 2100, the external object 2110, or a server computing device 2500, via a wireless communication link such as the wireless communication link 2380 or a wired communication link such as the wired communication link 2390.

The server computing device 2500 may include one or more server computing devices which may exchange (send or receive) state signal data with one or more vehicles or computing devices including the vehicle 2100, the external object 2110, or the operations center 2400, via the electronic communication network 2300.

In some embodiments, the vehicle 2100 or the external object 2110 communicates via the wired communication link 2390, a wireless communication link 2310/2320/2370, or a combination of any number or types of wired or wireless communication links. For example, as shown, the vehicle 2100 or the external object 2110 communicates via a terrestrial wireless communication link 2310, via a non-terrestrial wireless communication link 2320, or via a combination thereof. In some implementations, a terrestrial wireless communication link 2310 includes an Ethernet link, a serial link, a Bluetooth link, an infrared (IR) link, an ultraviolet (UV) link, or any link capable of providing for electronic communication.

A vehicle, such as the vehicle 2100, or an external object, such as the external object 2110 may communicate with another vehicle, external object, or the operations center 2400. For example, a host, or subject, vehicle 2100 may receive one or more automated inter-vehicle messages, such as a basic safety message (BSM), from the operations center 2400, via a direct communication link 2370, or via an electronic communication network 2300. For example, operations center 2400 may broadcast the message to host vehicles within a defined broadcast range, such as three hundred meters, or to a defined geographical area. In some embodiments, the vehicle 2100 receives a message via a third party, such as a signal repeater (not shown) or another remote vehicle (not shown). In some embodiments, the vehicle 2100 or the external object 2110 transmits one or more automated inter-vehicle messages periodically based on a defined interval, such as one hundred milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system state data, throttle information, steering wheel angle information, or vehicle routing information, or vehicle operating state information, such as vehicle size information, headlight state information, turn signal information, wiper state data, transmission information, or any other information, or combination of information, relevant to the transmitting vehicle state. For example, transmission state information indicates whether the transmission of the transmitting vehicle is in a neutral state, a parked state, a forward state, or a reverse state.

In some embodiments, the vehicle 2100 communicates with the electronic communication network 2300 via an access point 2330. The access point 2330, which may include a computing device, may be configured to communicate with the vehicle 2100, with the electronic communication network 2300, with the operations center 2400, or with a combination thereof via wired or wireless communication links 2310/2340. For example, an access point 2330 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 2100 may communicate with the electronic communication network 2300 via a satellite 2350, or other non-terrestrial communication device. The satellite 2350, which may include a computing device, may be configured to communicate with the vehicle 2100, with the electronic communication network 2300, with the operations center 2400, or with a combination thereof via one or more communication links 2320/2360. Although shown as a single unit, a satellite can include any number of interconnected elements.

The electronic communication network 2300 may be any type of network configured to provide for voice, data, or any other type of electronic communication. For example, the electronic communication network 2300 includes a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network can include any number of interconnected elements.

In some embodiments, the vehicle 2100 communicates with the operations center 2400 via the electronic communication network 2300, access point 2330, or satellite 2350. The operations center 2400 may include one or more computing devices, which are able to exchange (send or receive) data from: vehicles such as the vehicle 2100; external objects including the external object 2110; or computing devices such as the server computing device 2500.

In some embodiments, the vehicle 2100 identifies a portion or condition of the transportation network 2200. For example, the vehicle 2100 may include one or more on-vehicle sensors 2102, such as the sensor 1360 shown in FIG. 1, which includes a speed sensor, a wheel speed sensor, a camera, a gyroscope, an optical sensor, a laser sensor, a radar sensor, a sonic sensor, or any other sensor or device or combination thereof capable of determining or identifying a portion or condition of the transportation network 2200.

The vehicle 2100 may traverse one or more portions of the transportation network 2200 using information communicated via the electronic communication network 2300, such as information representing the transportation network 2200, information identified by one or more on-vehicle sensors 2102, or a combination thereof. The external object 2110 may be capable of all or some of the communications and actions described above with respect to the vehicle 2100.

For simplicity, FIG. 2 shows the vehicle 2100 as the host vehicle, the external object 2110, the transportation network 2200, the electronic communication network 2300, and the operations center 2400. However, any number of vehicles, networks, or computing devices may be used. In some embodiments, the vehicle transportation and communication system 2000 includes devices, units, or elements not shown in FIG. 2. Although the vehicle 2100 or external object 2110 is shown as a single unit, a vehicle can include any number of interconnected elements.

Although the vehicle 2100 is shown communicating with the operations center 2400 via the electronic communication network 2300, the vehicle 2100 (and external object 2110) may communicate with the operations center 2400 via any number of direct or indirect communication links. For example, the vehicle 2100 or external object 2110 may communicate with the operations center 2400 via a direct communication link, such as a Bluetooth communication link. Although, for simplicity, FIG. 2 shows one of the transportation network 2200, and one of the electronic communication network 2300, any number of networks or communication devices may be used.

Figure 3:
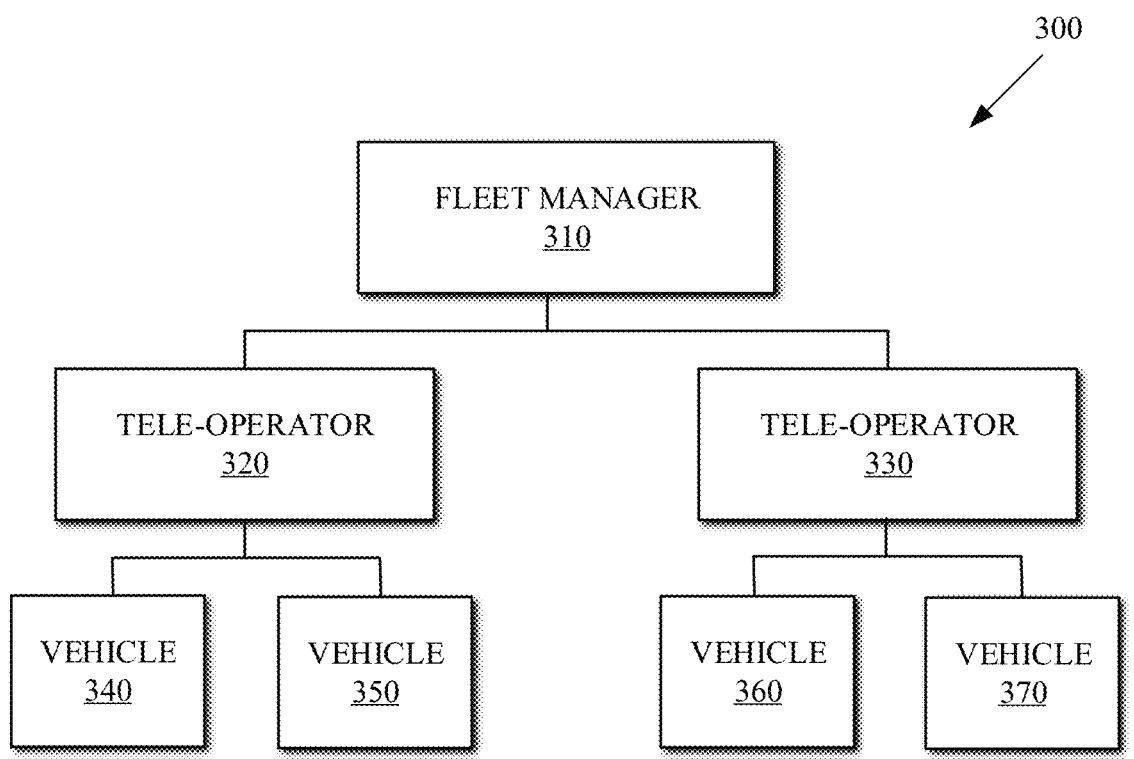
FIG. 3 is a block diagram illustrating a remote vehicle assistance center according to implementations of this disclosure.

FIG. 3 is a block diagram illustrating a remote vehicle assistance center 300 according to implementations of this disclosure. The remote vehicle assistance center 300 can also be referred to as a remote system or a tele-operations center. The remote vehicle assistance center 300 includes a fleet manager 310, a plurality of vehicle managers (i.e., tele-operators) including but not limited to a tele-operator 320 and a tele-operator 330, and a plurality of vehicles including but not limited to vehicles 340, 350, 360, and 370.

The fleet manager 310 can include an apparatus including some or all of the features of the controller 1300 shown in FIG. 1 or the controller apparatus 2410 of FIG. 2. The fleet manager 310 can monitor and coordinate tele-operators, including the tele-operators 320/330 as well as the movement of vehicles, including autonomous vehicles, and the vehicles 340/350/360/370. Monitoring and coordinating the tele-operators can include any of: assigning, allocating, or deallocating, vehicles to the tele-operators; reviewing and monitoring performance data of the tele-operators; and assigning tele-operators to a geographic area. In an implementation, there can be multiple fleet managers, who may in turn be managed or under the authority of other fleet managers.

The tele-operator 320 can monitor the state or condition of vehicles, including the vehicle 340 and the vehicle 350. As illustrated in FIG. 3, the tele-operator 320 has been assigned vehicle 340 and vehicle 350. The assignment of vehicles to a tele-operator can be performed by a fleet manager such as the fleet manager 310.

The tele-operator 330 can monitor the state or condition of vehicles, including the vehicle 360 and the vehicle 370. As illustrated in FIG. 3, the tele-operator 330 has been assigned vehicle 360 and vehicle 370. The assignment of vehicles to a tele-operator can be performed by a fleet manager such as the fleet manager 310. The assignment of vehicles to a tele-operator can also be automated using machine learning techniques.

In an implementation, the tele-operators can cluster or group the vehicles, establish communication with occupants in the vehicle, remotely operate the vehicles, and coordinate the movement of the vehicles through a transportation network or around various obstacles such as traffic congestion. The tele-operators can interact with other tele-operators to aid in the monitoring and management of the vehicles.

The vehicles including the vehicle 340/350/360/370 comprise vehicles such as the vehicle 2100 as shown in FIG. 2, that are being monitored or coordinated by the fleet manager 310. The vehicles can be operated autonomously or by a human driver and can exchange (send and receive) vehicle data relating to the state or condition of the vehicle and its surroundings including any of: vehicle velocity; vehicle location; vehicle operational state; vehicle destination; vehicle route; vehicle sensor data; external object velocity; and external object location.

In the description herein, sentences describing the autonomous vehicle as taking an action (such as performing, determining, initiating, receiving, calculating, deciding, etc.) are to be understood that some appropriate module of the AV as taking the action. Such modules may be stored in a memory of the AV, such as the memory 1340 of FIG. 1, and executed by a processor, such as the processor 1330 of FIG. 1. Such modules may be partially or fully included in a controller apparatus, such as the controller apparatus 2410 of FIG. 2 and may be partially or fully executed by a processor of the AV, a processor of an operations center, or a combination thereof. For example, the statement "the AV determines a trajectory" can be understood to mean that "a module of the AV determines a trajectory" or "a trajectory planning module of the AV determines a trajectory."

Figure 4:
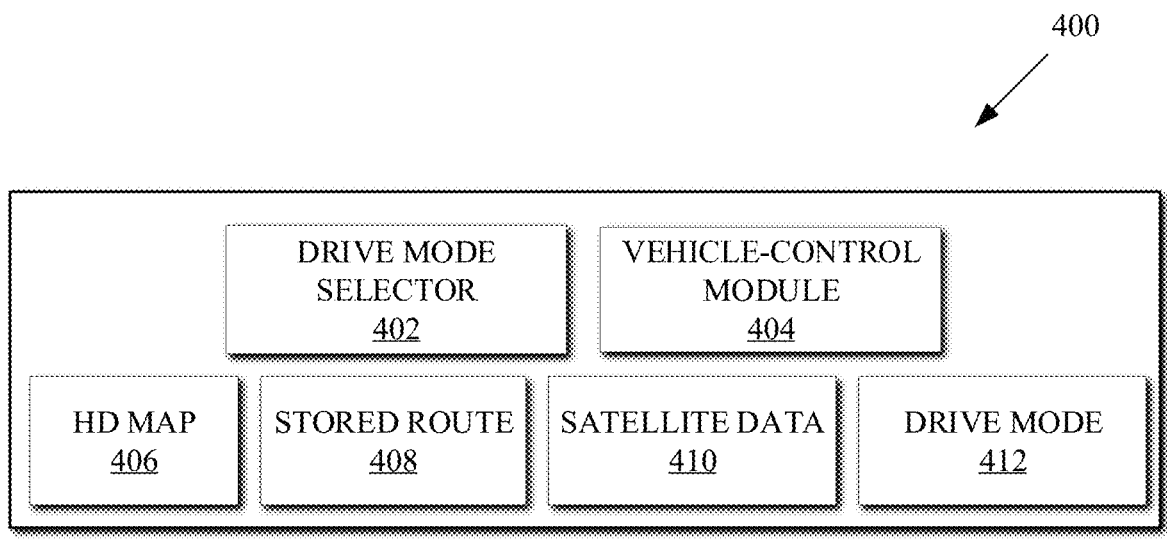
FIG. 4 is an example of modules of a system for drive mode selection according to implementations of this disclosure.

FIG. 4 is an example of modules of a system 400 for drive mode selection according to implementations of this disclosure. The system 400 can optimize a whole route by determining (e.g., identifying, selecting, calculating, or determining is any way whatsoever) the best transition points depending on each drive mode specification and provided constraints, if any.

The system 400 can be included in a vehicle (e.g., an autonomous vehicle or a connected vehicle) including the vehicle 1050 shown in FIG. 1, the vehicle 2100 shown in FIG. 2, one of the vehicles 340/350/360/370 of FIG. 3. The system 400 can be stored in a memory, such as the memory 1340 of FIG. 1, as computer executable instructions that can be executed by a processor, such as the processor 1330 of FIG. 1.

The system 400 can be included in (e.g., implemented by, deployed at, etc.) a system that is remote to a vehicle. For example, the system 400 can be included in a controller apparatus, such as the controller apparatus 2410 of FIG. 2, or a server computing device, such as the server computing device 2500 of FIG. 2. The system 400 can be implemented as a combination of one or more hardware-implemented modules and/or software modules. The system 400 can be included in a remote vehicle assistance center.

The system 400 can be a system that receives a request for a whole route (or simply, route) from an origin location to a destination location. The system 400 can output the route including drive modes for route segments of the whole route. The request can be received from a requester. The requester can be the vehicle. For example, a driver or an occupant of the vehicle who uses controls available in the vehicle to issue the request. The requester can be another device. For example, the vehicle may be operating a service (e.g., a robo-taxi, a car rental service, etc.), which may be requested by a user via a mobile device. Thus, the request can be received at/by the system 400 from the mobile device in the process of the user requesting the service. In an example, the user can receive the route including the route segments and corresponding drive mode on the mobile device.

In another example, the request can be received from a remote vehicle assistance center. For example, a tele-operator, such as the tele-operator 320 of FIG. 3, may send a request to a vehicle, such as one of the vehicles 340, 350, that the vehicle is to be moved from an origin location to a destination location. In the process of issuing the request to the vehicle, a request can be issued (such as by the tele-operator, by the vehicle, and/or by a system that forwards the tele-operator request to the vehicle) to the system 400. The tele-operator can be notified of the route segments and corresponding drive modes, as determined by the system 400. The route segments and corresponding drive modes can be displayed on a display of the tele-operator. For example, the route segments can be displayed on a map display. The route segments can be color coded such that each drive mode is indicated by a respective color. Textual or visual annotations indicating the drive modes can be identified with/for the route segments.

The system 400 includes a drive-mode-selector module 402, a vehicle-control module 404, a high-definition (HD) map data 406, stored route data 408, satellite data 410, and drive mode module 412. However, the system 400 is not so limited. The system 400 can include fewer, more, other modules, or a combination thereof. In some examples, modules may be combined, divided, or the like. In some examples, the modules and/or functionality of the system 400 may be distributed among several cooperating (e.g., communicating) systems that me deployed at different physical locations. For example, some of the modules may be available in (e.g., deployed in, executing at, etc.) the vehicle while others may be available in a centralized system. In an example, the system 400 may not include the vehicle-control module 404. For example, where it is merely desirable to obtain route segments and corresponding drive modes without necessarily controlling a vehicle accordingly, the vehicle-control module 404 may not be used.

Figures 5A, 5B:
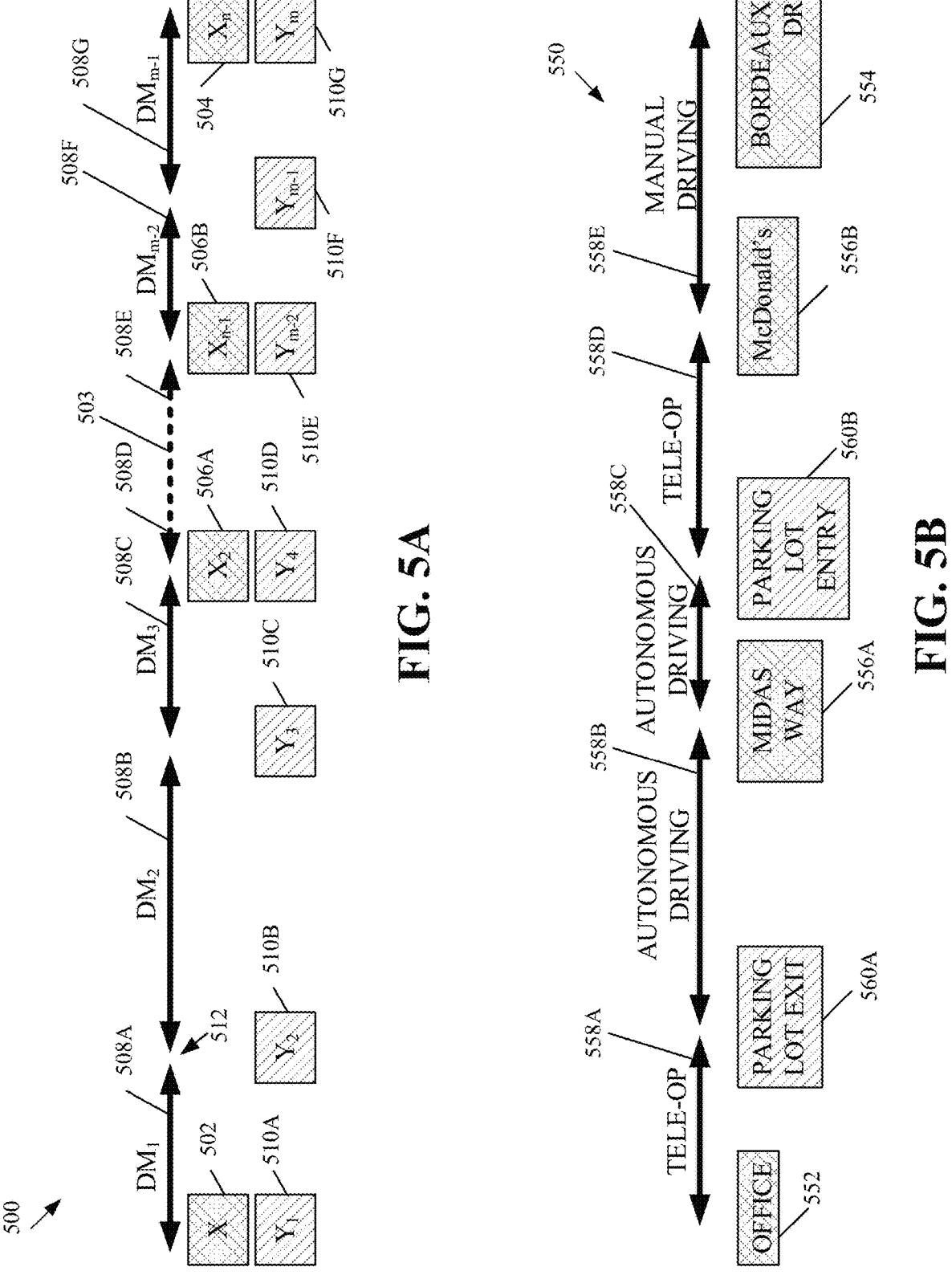
FIG. 5A is an illustration of a general example of partitioning a route into route segments and assigning drive modes to the route segments according to implementations of this disclosure.
FIG. 5B is an illustration of a specific example of partitioning a route into route segments and assigning drive modes to the route segments according to implementations of this disclosure.

FIGS. 5A-5B are used to better elucidate the system 400. FIG. 5A is an illustration of a general example 500 of partitioning a route into route segments and assigning drive modes to the route segments according to implementations of this disclosure. FIG. 5B is an illustration of a specific example 550 of partitioning a route into route segments and assigning drive modes to the route segments according to implementations of this disclosure. The general example 500 and the specific example 550 are illustrative examples and do not limit this disclosure or implementations according to this disclosure in any way.

The general example 500 of FIG. 5A includes an origin location 502 (i.e., location $X_1$) and a destination location 504 (i.e., location $X_n$). The general example 500 also includes waypoints 506A-506B (i.e., locations $X_2$ through $X_{n-1}$). A waypoint can be a location between the origin location and the destination location that the vehicle should pass through (e.g., drive by, stop at, etc.).

The general example 500 illustrates that the route between the origin location 502 and the destination location 504 is partitioned by the system 400 into route segments 508. A transition point 510 is identified between each two successive route segments. For example, the transition point 510B is the transition point between route segments 508A and 508B; the transition point 510F is the transition point between a route segments 508F and a route segment 508G; and so on.

Generally, a transition point can be defined as a location where the drive mode changes from a current drive mode to another drive mode. For example, the system 400 may determine that on a route segment 508B, the drive mode $DM_2$ is to be used to control the vehicle and that, when the vehicle arrives at the transition point 510C, the drive mode is to be changed to the drive mode $DM_3$. However, a transition point may also correspond with a waypoint. In such a case, the drive mode in the route segment ending at the waypoint/transition point may be the same as the drive mode in the route segment starting at the waypoint/transition point.

A dashed segment 503 illustrates that there could be many waypoints between $X_2$ and $X_{n-1}$ and/or many transition points between $Y_4$ and $Y_{m-2}$. Cross hatched boxes are used to indicate waypoints and anti-diagonally lined boxes are used to indicate transition points. It is to be noted that it is not necessarily the case that a waypoint has to also be (e.g., correspond to, etc.) a transition point. That is, it is not necessarily the case that the system 400 would identify transition points at the waypoints. That is, the drive mode before a waypoint may be the same drive mode after the waypoint. It is also to be noted that gaps (such as a gap 512) between the route segments 508 have no special significance other than to illustrate locations of transition points and waypoints. The gaps are also used to illustrate, for example, a change from one drive mode (e.g., $DM_1$) in a first route segment (e.g., the route segment 508A) before the gap 512 to a second drive mode (e.g., $DM_2$) in a second, immediately succeeding route segment (e.g., the route segment 508B) after the gap 512.

Zero or more waypoints may be provided, such as by a requester. It is also be noted that while the origin location 502 and the destination location 504 are not strictly waypoints, they may be considered to be waypoints for ease of reference. Thus, a waypoint can be considered to be any location that the vehicle stops at/passes by, including the origin location and the destination location.

Turning now to the specific example 550 of FIG. 5B. A user desires to travel, via a vehicle, from an origin location 552 (e.g., his/her office) to a destination location 554 (e.g., his/her home on Bordeaux Dr.). Furthermore, the user indicates that he/she would like to pass through a waypoint 556A (e.g., Midas Way) and a waypoint 556B (for example, to pick up dinner at McDonald's).

For example, while, in his/her car, the user may enter the destination location 554 and the waypoints 556A, 556B, and the system 400 can provide a route including route segments and drive modes as further described below. In another example, via an application that allows the user to order a robo-taxi service (e.g., an autonomous vehicle that may serve as a taxi), which may be available on a mobile device of the user, the user may order a taxi, include the origin location 552, the destination location 554, and the waypoints 556A, 556B. In an example, the origin location may be inferred to be the location (e.g., the GPS coordinates, etc.) of the mobile device or vehicle. Other ways of providing the origin location, the destination location, and, optionally, one or more waypoints are possible.

The system 400 partitions a route between the origin location 552 and the destination location 554 into route segments, including transition points (and the waypoints, if provided) and identify a drive mode for each of the segments. As illustrated in the specific example 550, the system 400 identifies the following.

For a route segment 558A, the tele-operator assisted drive mode drive mode (e.g., a first drive mode) is identified. In an example, the vehicle may be parked in a parking lot for which no HD map data is available. Thus, the vehicle (i.e., an AV) may not be able to identify a path to autonomously exit the parking lot. However, as satellite data may be available, a tele-operator may be able to connect to the vehicle in real time, observe (using the satellite data and image data from cameras of the vehicle) the surroundings of the vehicle and chart a path for the vehicle to the exit of the parking lot, which is identified as a transition point 560A. In an example, the satellite data can be used to generate (e.g., create, display, etc.) an augmented view of the vehicle overlaid on a satellite view of the location of the vehicle. The augmented view can provide the tele-operator with a view of any structures (e.g., buildings, etc.), obstructions, and the like about the location of the vehicle.

For a route segment 558B, the autonomous drive mode is identified (e.g., a second drive mode). The autonomous drive mode may be identified because, for example, HD map data is available for the route segment 558B and, as such, a path for autonomous driving can be identified. The route segment 558B starts at the transition point 560A and ends at the waypoint 556A. For a route segment 558C, the autonomous drive mode is also identified (e.g., a third drive mode). The route segment 558C starts at the waypoint 556A and ends at the transition point 560B. In an example, as the same drive mode (i.e., the autonomous drive mode) is identified for the route segments 558B and 558C, the system 400 may combine the route segments 558B and 558C into one route segment that starts at the transition point 560A and ends at the waypoint 556B.

The transition point 560B may be identified by the system 400 as such (i.e., as a transition point) because, for example, no HD map data may be available for the parking lot (or the drive-through window of the waypoint 556B). Thus, for reasons similar to those described above with respect to the route segment 558A, the system 400 identifies the tele-operator assisted drive mode for the route segment 558D (e.g., a fourth drive mode). Finally, the system 400 identifies that, for a final route segment of the user's route (i.e., a route segment 558E), the drive mode is the manual drive mode (e.g., a fifth drive mode).

Returning to FIG. 4, the drive-mode-selector module 402 can, as described above, partition a whole route into route segments and assign drive modes to the route segments. For example, the drive-mode-selector module 402 can receive an origin location and a destination location. The drive-mode-selector module 402 can also optionally receive waypoints. The drive-mode-selector module 402 identifies transition points which divide the route into route segments. The drive-mode-selector module 402 can use at least one of the HD map data 406, the stored route data 408, the satellite data 410, drive mode module 412, fewer, more, other modules, or data, or a combination thereof to identify the route segments and corresponding drive modes.

In an example, a route planning module may be available. In an example, the route planning module may be part of the system 400. The route planning module may not be part of the system 400; rather a whole route may be generated by the route planning module before being received by the system 400. As such, in either case, the route planning module can determine a road-level plan (i.e., a whole route). For example, given a starting location and an ending location, the route planning module can determine a route from the starting location to the ending location. For example, the route planning module can determine the list of roads (i.e., the road-level plan) to be followed by the vehicle to navigate from the starting location to the ending location.

In an example, the route planning module can be used to identify a route for a route segment. For example, the route planning module can be provided with the transition point 510B as a starting location and the transition point 510C as an ending location and the route planning module determines a route between the transition points 510B and 510C.

In another example, the route planning module can identify the whole route, which may include one or more waypoints, between the origin location (e.g., the origin location 502 of FIG. 5A) and the destination location (e.g., the destination location 504 of FIG. 5A). The identified whole route can then be provided to the drive-mode-selector module 402, which then identifies transition points on the route and assigns (e.g., selects, identifies, obtains, calculates, etc.) drive modes to the route segments.

The vehicle-control module 404 can be used to control the vehicle according to a drive mode. For example, in the case of the autonomous drive mode or the ADAS drive mode, the vehicle-control module 404 can be as described with respect to the controller 1300 of FIG. 1. For example, in the case of the tele-operator assisted drive mode, the vehicle-control module 404 may issue a request for remote assistance to a tele-operator.

For example, in anticipation of the vehicle switching to the tele-operator assisted drive mode, the vehicle-control module 404 can issue a request for assistance to the tele-operator. The request for assistance can be issued a predetermined amount of time (e.g., 2 minutes, 1 minute, or some other amount of time) or a predetermined distance (e.g., 1 mile, 2 miles, or some other distance) away from the waypoint at which the drive mode is to be switched to the tele-operator assisted drive mode. This way, the tele-operator can remotely connect to the vehicle and smoothly transition the vehicle to the tele-operator assisted drive mode. In another example, the request to the tele-operator can be issued as soon as the vehicle starts off on whole route.

In an example, a route segment may be identified because an obstruction is identified along the whole route. The system 400 can include the tele-operation map data, which can be included in the stored route data 408, that are manually generated by a tele-operator in response to, or in anticipation of, exceptional situations (e.g., an obstruction, an accident, construction) that the vehicle will encounter on the road and is not capable of automatically (i.e., autonomously) handling.

In the case of manual drive mode, the vehicle-control module 404 can warn the driver to take control of the vehicle. The vehicle-control module 404 warns the driver (such as via an audible signal, a visual and/or textual warning displayed on the dashboard or another display of the vehicle, etc.) to take control of the vehicle by, for example, placing his/her hands on the steering wheel.

The HD map data 406 is data from a high-definition (i.e., high-precision) map, which can be used by an autonomous vehicle. The HD map data 406 can include accurate information regarding a vehicle transportation network to within a few centimeters. For example, the HD map data 406 can include details regarding road lanes, road dividers, traffic signals, traffic signs, speed limits, and the like. When HD map data is available for a route segment, the drive-mode-selector module 402 can select the autonomous drive mode for the route segment.

The stored route data 408 can include data regarding paths previously followed by the autonomous vehicle. To illustrate, and without loss of generality, an operator (e.g., a driver or a remote operator) of the autonomous vehicle may have recorded a path (e.g., as the vehicle is traversing the path) from the street into the garage of a home or, for example, from the parking lot of an office building to the exit of the parking lot. Thus, if no HD map data 406 is available for a route segment, but a stored route is available in the stored route data 408, then the drive-mode-selector module 402 can select the autonomous driving mode.

The satellite data 410 can include aerial views of a route segment such that a tele-operator, viewing the satellite data can obtain a situational awareness of an environment in which a vehicle is or will be operating. A tele-operator can use the satellite data in addition to images from cameras of the vehicle to chart (e.g., draw, etc.) a path that the vehicle can take in the route segment. In an example, satellite data may not be available but the vehicle may be equipped with a number of cameras, which can live-stream images to the tele-operator. The tele-operator may be able to see the environment of the vehicle from the point of view of one or more cameras, can switch camera views, and can remotely pan/zoom/tilt one or more of the cameras in order to obtain the situational awareness enabling the tele-operator to chart a path for the vehicle.

The drive mode module 412 includes information regarding available drive modes that the drive-mode-selector module 402 can select from. For each drive mode, the drive mode module 412 can include conditions and/or constraints under which the drive mode can be used (e.g., applied, etc.) and/or cannot be used. Non-limiting examples of conditions and constraints are not provided.

For example, the drive mode module 412 can select the autonomous drive mode for a route segment when HD map data is available for the route segment and the vehicle is an autonomous vehicle. In another illustrative example, the drive mode module 412 can select the autonomous drive mode for highway route segments but cannot select the autonomous drive mode within city route segments. For example, the drive mode module 412 can select the tele-operator assisted drive mode for a route segment when satellite data is available for the route segment and the vehicle is an autonomous vehicle. For example, the drive mode module 412 can select the stored-path drive mode for a route segment when a stored path is available for the route segment and the vehicle is an autonomous vehicle.

For example, the drive mode module 412 can select the ADAS drive mode for a route segment when map data, which is to be distinguished from HD map data, is available for the route segment and the vehicle is either an autonomous vehicle or a connected vehicle. Map data can be used to confirm that the vehicle can traverse the route segment using some type of a road. For example, the drive mode module 412 can select the manual drive mode for a route segment when map data is available for the route segment and the vehicle is either an autonomous vehicle or a connected vehicle. For example, the drive mode module 412 can select the manual drive mode when no map data is available.

A connected vehicle is a vehicle that is capable of communicating with a server or another vehicle. In some examples, a connected vehicle can merely receive a route to be displayed on a display of the vehicle, such as on a map display of a navigation application. As such, in the manual drive mode, the driver can follow the route instructions. In some examples, a connected vehicle can remotely receive control commands to active certain safety features (if available), such as lane assist, adaptive cruise control, and the like, which can be used by/for the ADAS drive mode. The remote commands can be received from or initiated by the vehicle-control module 404.

The system 400 can also receive one or more constraints, which the system 400 can use to determine (e.g., select, identify, choose, calculated, etc.) the transition points and/or the drive modes.

For example, the system 400 can receive a constraint to include (e.g., use, etc.) traffic information. The traffic information can include traffic sign information and/or queue lengths information for at least some of the traffic signs (e.g., traffic lights, stop signs, yield signs, etc.). The traffic information can also include road obstructions, such as construction sites, accidents, slowdowns, and the like.

Such traffic information can be used in determining the whole route. The traffic information can be real-time information or can be average information aggregated over a period of time. In an example, the average information for a traffic sign can be average information for a time period that the vehicle is expected to be arriving at the traffic sign given the determined whole route. In an example, the traffic sign information can include whether a traffic light will be green or red when the vehicle would arrive at the traffic light given the determined route and the expected wait time at the traffic light, if it is red. An alternate route may be determined, for example, if the traffic light would be red and the alternate route would require less time. In an example, the duration that the vehicle would be expected to wait at the traffic light (before it turns green) can be used to determine the route.

The traffic information can be obtained (e.g., aggregated, received, calculated, identified, determined, etc.) in any number of ways or combinations thereof. The system 400 can obtain the traffic information from another system (e.g., a traffic control system, etc.) that includes the traffic information. For example, a system that is managed (e.g., controlled, populated, etc.) by a jurisdiction (e.g., a city, a county, a state, or the like) may include such traffic information. In another example, the system 400 may use public sensors to determine the traffic information. For example, the system 400 can use publicly accessible cameras that may have a view of a traffic sign to determine queue lengths and wait times at the traffic sign based on images received from the cameras. In another example, traffic flows (on roads and/or near traffic signs) can be analyzed using data received from infrastructure sensors that may be embedded in roads or received from other vehicles traveling those roads. FIG. 9 illustrates using traffic information to optimize a route. In another example, the traffic information can be obtained from vehicles and/or devices (e.g., cell phones) of occupants of the vehicles.

In another example, and as already mentioned above, a constraint can be that a specific drive mode is to be used in a certain route segment.

Figure 6:
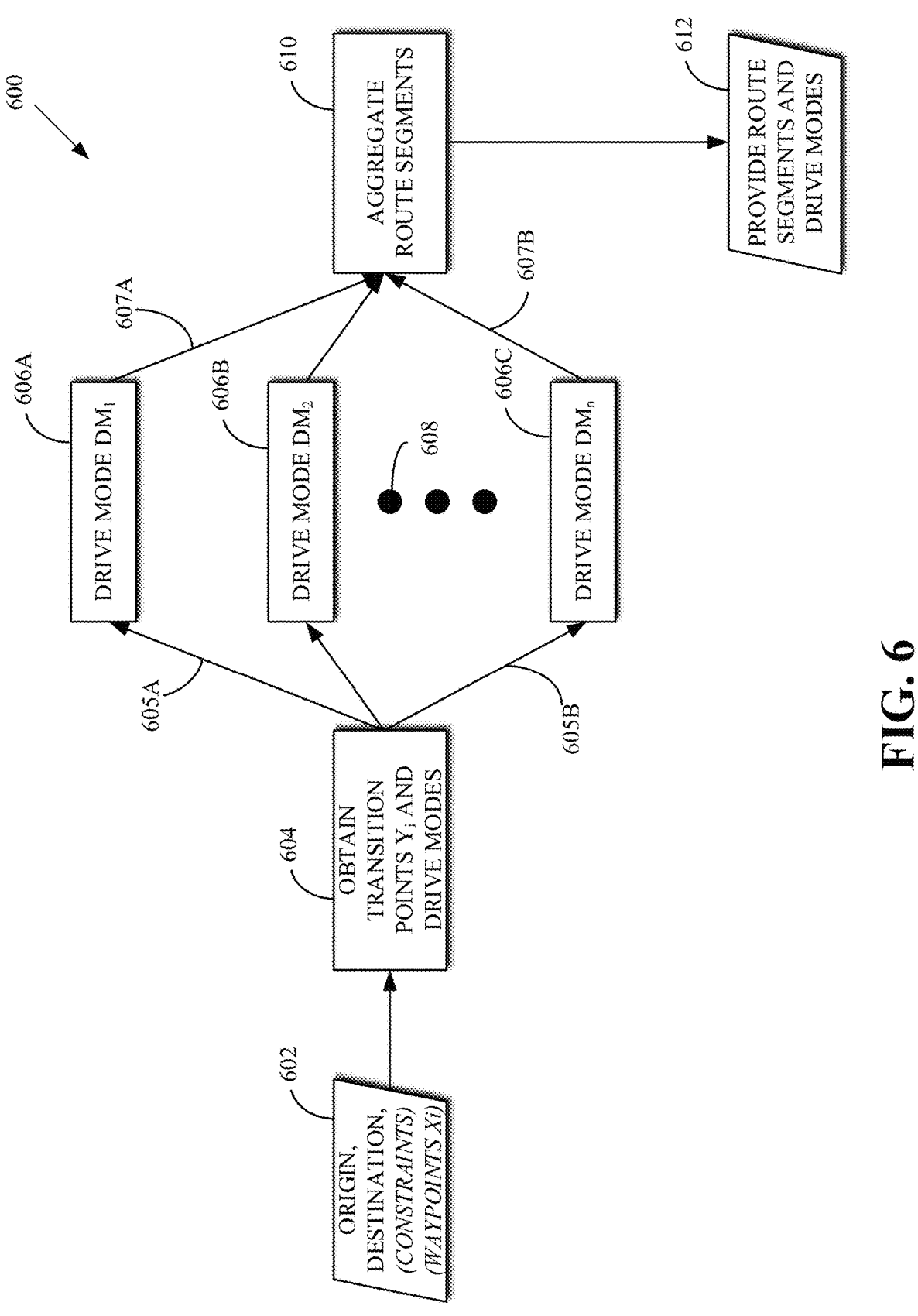
FIG. 6 is an example of a flowchart of a technique for drive mode selection according to implementations of this disclosure.

FIG. 6 is an example of a flowchart of a technique 600 for drive mode selection according to implementations of this disclosure. The technique 600 can be implemented, partially or fully, by a system, such as the system 400 of FIG. 4. The technique 600 can be implemented by a vehicle (e.g., an autonomous vehicle or a connected vehicle) including the vehicle 1050 shown in FIG. 1, the vehicle 2100 shown in FIG. 2, one of the vehicles 340/350/360/370 of FIG. 3. The technique 600 can be stored in a memory, such as the memory 1340 of FIG. 1, as computer executable instructions that can be executed by a processor, such as the processor 1330 of FIG. 1. The system 400 can be included in (e.g., implemented by, deployed at, etc.) a system that is remote to, but can be in communications with, a vehicle. In an example, the system 400 can be implemented by a controller apparatus, such as the controller apparatus 2410 of FIG. 2, or a server computing device, such as the server computing device 2500 of FIG. 2. The system 400 can be included in a remote vehicle assistance center.

At 602, the technique 600 receives, as described above, an origin location and a destination location. In an example, the technique 600 can optionally receive one more waypoints. In an example, the technique 600 can optionally receive one or more constraints.

At 604, the technique 600 uses the origin location, the destination location, the waypoints (if any), the constraints (if any) to obtain transition points and drive modes, as described above. As used in this disclosure, "obtain" means to create, form, produce, select, construct, identify, specify, generate, determine, calculate, receive, or other obtain, in any manner whatsoever. The technique 600 can use any optimization technique (e.g., route optimization, constrained optimization, etc.), to obtain the transition points and the drive modes. For example, the optimization technique can be or can include a Partially Observable Markov Decision Process (POMDP) model, a Markov Decision Process (MDP) model, a Classical Planning model, a Partially Observable Stochastic Game (POSG) model, a Decentralized Partially Observable Markov Decision Process (Dec-POMDP) model, a Reinforcement Learning (RL) model, an artificial neural network model, or any other model optimization model.

In an example, a whole route is first obtained between the origin location and destination location. The whole route may be obtained using a route planning module or system that may be used by (e.g., called by, is a part of, etc.) the technique 600. The technique 600 uses the whole part of identify the transition points and the drive modes. That is, the technique 600 uses the whole route to compute (e.g., identify, select, etc.) an optimal sequence of drive modes. The transition points partition the route into route segments. The technique 600 obtains drive modes for the segments. Said another way, the technique 600, using information regrading the drive modes, described above with respect to the drive mode module 412 and/or other modules described with respect to FIG. 4, obtains the transition points and the drive modes.

For at least some of the modes $DM_i$, the technique 600 can provide the starting transition point $Y_k$ and the ending transition point $Y_{k+1}$ to a routing module to obtain a best route for the route segment between $Y_k$ and $Y_{k+1}$. For example, the technique 600 can provide, along an input line 605A the pair of transition points $(Y_1, Y_2)$ to a routing step 606A that returns to the technique 600, along an output path 607A, a sub-route between the pair of transition points $(Y_1, Y_2)$. As another example, the technique 600 can provide, along an input line 605B the pair of transition points $(Y_k, Y_{k+1})$ to a routing step 606C that returns to the technique 600, along an output path 607B, a sub-route between the pair of transition points $(Y_k, Y_{k+1})$. For some route segments, for example those where tele-operation may be used, receiving a sub-route may be deferred until the tele-operator provides the sub-route. Thus, the sub-route for such route segments may initially merely include the pair of transition points.

It is to be noted that in some implementations, one or more of the routing steps 606A-606C may be implemented by the technique 600 itself; while in other implementations, none of the routing steps 606A-606C are implemented by the technique 600 itself. It is also to be noted that, while three sub-routes generated by steps 606A-606C in FIG. 6, fewer or more sub-routes can be obtained, as illustrated by an ellipsis 608.

At 610, the technique 600 receives all the sub-routes for the route segments from the routing steps 606A-606C, and aggregates the sub-routes into the whole route. That is, the technique 600 sequentially arranges the sub-routes into the whole route.

At 612, the technique 600 provides the route segments and the drive modes constituting the whole route through the waypoints, if any. For example, the whole route can be provided for display, such as on a map display, which may include verbal turn-by-turn instructions and drive-mode-by-drive-mode instructions.

FIG. 7 is an example of a flowchart of a technique 700 for navigating a vehicle from an origin location to a destination location according to an implementation of this disclosure. The technique 700 selects drive modes for route segments for a whole route from the origin location to the destination location. Some or all of the technique 700 for drive mode selection may be implemented in the vehicle, which can be an autonomous vehicle or a connected vehicle, including the vehicle 1050 shown in FIG. 1, the vehicle 2100 shown in FIG. 2, one of the vehicles 340/350/360/370 of FIG. 3, or a computing apparatus including a controller apparatus such as the controller apparatus 2410 shown in FIG. 2. The controller apparatus can include a routing system (such as the routing system 400 of FIG. 4) or the controller apparatus can comprise a routing module. In an implementation, some or all aspects of the technique 700 can be implemented in a system combining some or all of the features described in this disclosure. The technique 700 can be executed, partially or fully, by at least some of the modules of the routing system 400 of FIG. 4.

At 702, the technique 700 receives, from a requester, the origin location and the destination location. The receiver can be a user as described above with respect to FIGS. 4 and 5A-5B.

At 704, the technique 700 determines a transition point between the origin location and the destination location. The transition point partitions a portion of a route between the origin location to the destination location into a first route segment and a second route segment. To illustrate, and without loss of generality, the transition point can be the transition point 510C, the first route segment can be the route segment 508B, and the second route segment can be the route segment 508C of FIG. 5A. As described above, the vehicle is to be driven according to a first drive mode (e.g., $DM_2$ of FIG. 5A) in the first route segment (e.g., the route segment 508B) that ends at the transition point (e.g., $Y_3$ of FIG. 5A) and the vehicle is to be driven according to a second drive mode (e.g., $DM_3$ of FIG. 5A) in the second route segment (e.g., the route segment 508C) that starts at the transition point. The first drive mode can be different from the second drive mode. However, that need not be the case. The first drive mode and the second drive mode can be selected from available drive modes, each of the available drive modes indicating a respective way of operating the vehicle. In an example, the available drive modes can include an autonomous drive mode, a tele-operator assisted drive mode, a manual drive mode, a stored-path drive mode, or a driver-assistance drive mode.

In an example, the available drive modes include the autonomous drive mode and determining the transition point between the origin location and the destination location can include selecting the transition point based on a determination that high-definition map information is available for only one of the first route segment or the second route segment.

In an example, the available drive modes include a tele-operator assisted drive mode and determining the transition point between the origin location and the destination location can include selecting the transition point based on a determination that high-definition map information is not available but satellite image information is available for only one of the first route segment or the second route segment.

In an example, the available drive modes include a stored-path drive mode and determining the transition point between the origin location and the destination location can include determining that a stored path is available for the first route segment and selecting the stored-path drive mode as the first drive mode.

In an example, determining the transition point between the origin location and the destination location can include receiving at least one constraint for navigating the vehicle and determining the transition point based on the at least one constraint. In an example, the at least one constraint can include traffic information. In an example, the traffic information can include at least one of timing information of traffic lights or queue lengths information at the traffic lights. In an example, the at least one constraint can include obstruction information between the origin location and the destination location. In an example, the at least one constraint for navigating the vehicle can include a selected drive mode to be used in a third route segment. For example, the user may indicate that for a particular route segment between a first waypoint and second waypoint the selected drive mode (e.g., the manual drive mode) is to be used. For example, for whatever reason, a driver may indicate that the manual drive mode is to be used between a first waypoint and second waypoint. In such a case, the technique 700 can use the first waypoint and the second waypoint as transition points.

At 706, the technique 700 provides the transition point, the first route segment, and the second route segment to the requester. In an example, providing the transition point, the first route segment, and the second route segment to the requester can be as described above with respect to 612 of FIG. 6.

FIG. 8 is an example of a flowchart of a technique 800 for routing a vehicle from an origin location to a destination location according to an implementation of this disclosure. The technique 800 can be implemented by a routing system, such as the routing system 400 of FIG. 4. The routing system can include a drive-mode selector, which can be the drive-mode-selector module 402 of FIG. 4, and a vehicle-control module, which can be the vehicle-control module 404 of FIG. 4. The technique 800 can be implemented as executable instructions that, when executed by a processor, perform the steps of the technique 800.

At 802, the drive-mode selector receives the origin location and the destination location, as described above. At 804, the drive-mode selector determines transition points between the origin location and the destination location, as described above. The transition points partition a route between the origin location and the destination location into route segments. At 806, the drive-mode selector determines respective drive modes for the route segments.

At 808, the vehicle-control module controls the vehicle according to the respective drive modes in the route segments, as described above.

In an example, the drive-mode selector can receive waypoints between the origin location and the destination location. A waypoint can be a location between the origin location and the destination location that the vehicle is to pass through or by.

In an example, the drive-mode selector can further receive an optimization criterion and determine the transition points between the origin location and the destination location using the optimization criterion, as described above. In an example, the optimization criterion can be to maximize a duration of an autonomous driving mode between the origin location and the destination location. In another example, the optimization criterion can be to minimize a driving time between the origin location and the destination location.

In an example, the drive-mode selector can receive a selected drive mode between a first intermediate location and a second intermediate location, the first intermediate location and the second intermediate location forming a route segment of the route segments, as described above. As such, determining the transition points between the origin location and the destination location can include including the first intermediate location and the second intermediate location in the determined transition points; and determining the respective drive modes for the route segments can include selecting the selected drive mode for the route segment.

In an example, the vehicle-control module can further initiate a request to a tele-operator for driving assistance of the vehicle, in response to determining that a waypoint is at a predefined distance of a current location of the vehicle and that an tele-operator driving mode is to be used at the waypoint, as described above.

In an example, vehicle-control module can further notify a driver of the vehicle of the manual driving mode and that instructing the driver to place a hand on a steering control of the vehicle, in response to determining that a waypoint is at a predefined distance of a current location of the vehicle and that a manual driving mode is to be used at the waypoint, as described above.

Another aspect of the disclosed implementations is another technique for routing a vehicle from an origin location to a destination location. The technique can be implemented by an apparatus. The apparatus can be a centralized server that receives the origin location and the destination location from another apparatus, such as a vehicle or a user device, as described above. The apparatus can include a processor that is configured to perform the steps of the technique. The steps of the technique can be stored as executable instructions that are executable by the processor.

The technique can include determining the route (e.g., a whole route) from the origin location to the destination location by partitioning the route into route segments and assigning respective drive modes to the route segments. The route segments and the respective (e.g., corresponding, etc.) drive modes can be selected based on availability of mapping data of the route segments, such as described with respect to FIG. 4. The route segments and the respective drive modes can be selected based on information regarding available drive modes, such as described with respect to the drive mode module 412 of FIG. 4. The technique can then provide, to the vehicle, the route segments and the respective drive modes.

In an example, the technique can include, in response to determining that high definition map data is available for a first route segment, selecting an autonomous driving mode for the first route segment; and, in response to determining that satellite map data is available but high definition map data is not available for a second route segment, selecting a tele-operator drive mode for the second route segment. In an example, the technique can include determining, using traffic information, at least some of the route segments. The traffic information can include traffic lights durations, traffic queue lengths at the traffic lights, or obstruction information.

FIG. 9 illustrates using traffic information to optimize a route according to implementations of this disclosure. FIG. 9 includes an origin location 912 and a destination location 914. For simplicity of explanation, only whole routes (shown in thick black lines) are shown, but drive modes and route segments are omitted from the description of FIG. 9. However, it is to be understood that, according to the foregoing description, the whole route can be partitioned into route segments according to transition points where a corresponding drive mode is obtained for each route segment.

A scene 910 illustrates a whole route 916 that does not use traffic information as a constraint. The scene 910 shows that a traffic light 913 is red (indicated by a dark circle) when the vehicle traversing the whole route 916 would arrive at the traffic light 913.

A scene 920 illustrates that, when including the constraint to use traffic information, a whole route 922 is obtained that avoids the traffic light 913. A scene 930 illustrates that an obstruction 932 is at a location 924 of the scene 920. However, obstruction information is not used in obtaining the whole route 922. On the other hand, a constraint to use obstruction information is illustrated in the scene 930. As such, a whole route 934 avoids the obstruction 932.

A scene 940 illustrates that the whole route of the scene 930 can be adjusted (e.g., updated) in real time using the constraints. When the vehicle has advanced to a current location 942, a new obstruction 944 is identified along the whole route 934. Thus, a new whole route 946 that avoids the new obstruction 944 is obtained.

The steps, or operations, of any method, process, technique, or algorithm described in connection with the implementations of the disclosed technology herein, may be implemented in hardware, firmware, software executed by hardware, circuitry, or any combination thereof. To facilitate explanation, the techniques 600, 700, and 800 shown in FIGS. 6-8 are depicted and described as a series of operations. However, the operations in accordance with this disclosure can occur in various orders or concurrently. Additionally, operations in accordance with this disclosure may occur with other operations not presented and described herein.

As used herein, the terminology "driver" or "operator" may be used interchangeably. As used herein, the terminology "brake" or "decelerate" may be used interchangeably. As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example," "embodiment," "implementation," "aspect," "feature," or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise, or clear from context, "X includes A or B" is intended to indicate any of the natural inclusive permutations. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Implementations of this disclosure provide technological improvements particular to computer networks and autonomous vehicle management, for example, those concerning the extension of computer network components to generate solutions associated with the operation and monitoring of autonomous vehicles. The development of new ways to generate solution data to, for example, generate solution data to address mechanical and electronic malfunctions in autonomous vehicles, or to overcome the limitations in programming of autonomous vehicles, is fundamentally related to autonomous vehicle related computer networks.

While the disclosed technology has been described in connection with certain embodiments, it is to be understood that the disclosed technology is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for navigating a vehicle from an origin location to a destination location, comprising:

receiving, from a requester, the origin location and the destination location;

receiving from a drive mode selector a particular drive mode for a particular route segment located between the origin location and the destination location;

planning, by a route planning module based on the drive mode selector, a route from the origin location to the destination location, wherein the route comprises one or more route segments and the particular drive mode is assigned to the particular route segment;

determining, a first transition point between the origin location and the destination location that partitions a portion of the route between the origin location to the destination location into a first route segment and a second route segment, wherein the first transition point is determined based at least in part on a determination that a stored path is available for the first route segment and whether a high-definition map including high-definition map information is available, wherein the vehicle is driven according to a first drive mode in the first route segment that ends at the first transition point and the vehicle is driven according to a second drive mode in the second route segment that starts at the first transition point, wherein the first transition point is a location that the high-definition map information is not available, wherein the first drive mode is different from the second drive mode, and if the first drive mode is an autonomous drive mode then the second mode is a non-autonomous drive mode or if the first drive mode is the non-autonomous drive mode then the second drive mode is the autonomous driving mode, and wherein the first drive mode is a stored-path drive mode defined by the stored path available for the first route segment, and the second drive mode is selected from available drive modes, the first drive mode indicating a corresponding way of operating the vehicle while traveling on the first route segment and the second drive mode indicating a corresponding way of operating the vehicle on the second route segment;

providing the first transition point, the first route segment, and the second route segment to the requester;

determining a second transition point between a current location of the vehicle and the destination location that partitions at least a portion of the second route segment into a third route segment and a fourth route segment, wherein the second transition point is determined based at least in part on at least one constraint for navigating the vehicle, wherein the vehicle is to be driven according to a third drive mode in the third route segment that ends at the second transition point and the vehicle is to be driven according to a fourth drive mode in the fourth route segment that starts at the second transition point, wherein the third drive mode is selected from the available drive modes and is different from the fourth drive mode, wherein the fourth drive mode is a manual drive mode when the at least one constraint comprises obstruction information between the current location and the destination location, and wherein the available drive modes are the autonomous drive mode, the non-autonomous drive mode, a tele-operator assisted drive mode, a manual drive mode, a stored-path drive mode, and a driver-assistance drive mode; and generating an optimized route with optimization criterion that is based upon a user desire related to conditions and constraints under which a drive mode is applied.

2. The method of claim 1, wherein the available drive modes comprise the tele-operator assisted drive mode, where a remote operator remotely operates the vehicle along the stored path, wherein satellite image information is available for only the second route segment so that the second mode along the second route segment is a non-autonomous drive mode.

3. The method of claim 1, wherein determining the first transition point comprises:

receiving a second constraint for navigating the vehicle; and determining the first transition point based on the second constraint.

4. The method of claim 1, further comprising:

receiving the at least one constraint for navigating the vehicle from a public sensor, wherein the at least one constraint comprises traffic information, and wherein the traffic information comprises timing information of traffic signs and queue lengths information at the traffic signs.

5. The method of claim 1, wherein the at least one constraint comprises obstruction information between the origin location and the destination location.

6. The method of claim 1, wherein the at least one constraint for navigating the vehicle comprises a selected drive mode to be used as the fourth drive mode.

7. The method of claim 1, further comprising:

aggregating traffic information over a period of time related to the route and generating an alternate route based on the traffic information aggregated.

8. The method of claim 7, further comprising:

determining obstruction information between the origin location and the destination location and updating the alternate route based upon the obstruction information.

9. The method of claim 1, wherein the optimization criterion relates to maximizing a duration the autonomous driving mode is applied between the origin location and the destination location.

10. A system for routing a vehicle from an origin location to a destination location, comprising:

a drive-mode selector configured to:

receive from a requester the origin location and the destination location;

receive from a drive mode selector a particular drive mode for a particular route segment located between the origin location and the destination location;

plan, by a route planning module based on the drive mode selector, a route from the origin location to the destination location, wherein the route comprises one or more route segments and the particular drive mode is assigned to the particular route segment;

determine transition points between the origin location and the destination location, wherein the transition points partition the route between the origin location and the destination location into the one or more route segments, and generate an optimized route with optimization criterion that is based upon a user desire related to conditions and constraints under which a drive mode is applied;

wherein a first transition point of the transition points between a first route segment of the one or more route segments and a second route segment of the one or more route segments is determined based at least in part on a determination that 1) no high-definition map information is available and satellite image information is available for the first route segment, and 2) whether high-definition map information is available for the second route segment, and wherein a second transition point of the transition points between a third route segment of the one or more route segments and a fourth route segment of the one or more route segments is determined based at least in part on at least one constraint for navigating the vehicle; and determine a first drive mode for the first route segment, a second drive mode for the second route segment, a third drive mode for the third route segment, and a fourth drive mode for the fourth route segment, wherein the first drive mode is defined by a tele-operator drive mode where a remote operator remotely operates the vehicle along the first route segment and the second drive mode is defined by an autonomous drive mode where the vehicle is autonomously driven along the second route segment, wherein the third drive mode is defined by an autonomous drive mode along a third route segment, and wherein the fourth drive mode is defined by a manual drive mode when the at least one constraint comprises obstruction information and the high-definition map information is not available; and a vehicle-control module configured to:

control the vehicle according to the first drive mode in the first route segment, the second drive mode in the second route segment, the third drive mode in the third route segment, and the fourth drive mode in the fourth route segment.

11. The system of claim 10, wherein the drive-mode selector is further configured to:

receive waypoints between the origin location and the destination location, wherein a waypoint is a location between the origin location and the destination location that the vehicle is to pass through or by.

12. The system of claim 10, wherein the drive-mode selector is further configured to:

receive the optimization criterion; and determine the transition points between the origin location and the destination location using the optimization criterion.

13. The system of claim 12, wherein the optimization criterion is to maximize a duration of the autonomous drive mode between the origin location and the destination location.

14. The system of claim 12, wherein the optimization criterion is to minimize a driving time between the origin location and the destination location.

15. The system of claim 10,
wherein the drive-mode selector is further configured to:
receive a selected drive mode between a first intermediate location and a second intermediate location, the first intermediate location and the second intermediate location forming a route segment of the route segments;
wherein to determine the transition points between the origin location and the destination location comprises to:
include the first intermediate location and the second intermediate location in the determined transition points; and
wherein to determine the respective drive modes for the route segments comprises to:
select the selected drive mode for the route segment.

16. The system of claim 10, wherein the vehicle-control module is further configured to:
in response to determining that a waypoint is at a predefined distance of a current location of the vehicle and that the tele-operator drive mode is to be used at the waypoint, initiating a request to the remote operator to assist in driving the vehicle.

17. The system of claim 10, wherein the vehicle-control module is further configured to:
notify, in response to determining that a waypoint is at a predefined distance of a current location of the vehicle and that the manual drive mode is to be used at the waypoint, instruct a user to place a hand on a steering control of the vehicle.

18. An apparatus for routing a vehicle from an origin location to a destination location, comprising:
a processor configured to:
receive a request to determine a route from the origin location to the destination location;
determine the route from the origin location to the destination location;
partition the route from the origin location to the destination location into route segments based at least in part on:
whether respective high-definition map data are available for at least some of the route segments,
whether a stored path is available for a first route segment of the route segments comprising at least the first route segment and a second route segment, and
a determination that the stored path is available for the first route segment,
wherein the stored path includes a path previously followed by the vehicle according to instructions of a human operator and the path previously followed by the vehicle is recorded,
wherein no high-definition map data is available for the first route segment and high-definition map data is available for the second route segment, and
wherein the first route segment and the second route segment are successive route segments;
assign a first drive mode to the first route segment, wherein the first drive mode is a non-autonomous drive mode and
assign a second drive mode to the second route segment, wherein the second drive mode is an autonomous drive mode,
wherein the first drive mode is defined by a stored-path drive mode,
wherein the first route segment, the second route segment, the first drive mode, and the second drive mode are selected based on availability of mapping data of the first route segment and the second route segment; and
provide, to the vehicle, the first route segment, the second route segment, the first drive mode, and the second drive mode;
receive at least one constraint for navigating the vehicle, wherein the at least one constraint is located between a current location of the vehicle and the destination location;
determine a route from the current location to the destination location;
partition the route from the current location to the destination location into a third route segment and a fourth route segment based at least in part on a location of the at least one constraint,
wherein the third route segment and the fourth route segment are successive route segments; and
assign a third drive mode to the third route segment and a fourth drive mode to the fourth route segment,
wherein the third drive mode is different from the fourth drive mode and the third drive mode is one of an available drive mode that includes a tele-operator assisted drive mode, a stored-path drive mode, and a driver-assistance drive mode, and
wherein the fourth drive mode is a manual drive mode when the at least one constraint comprises obstruction information between the current location and the destination location; and
generate an optimized route with optimization criterion that is based upon a user desire related to conditions and constraints under which a drive mode is applied.

19. The apparatus of claim 18, wherein the processor is further configured to:
determine, using traffic information, at least some of the route segments,
wherein the traffic information includes at least two of traffic lights durations, traffic queue lengths at the traffic lights, or obstruction information.

20. The apparatus of claim 18, wherein the at least one constraint comprises obstruction information between the origin location and the destination location.

* * * * *